United States Patent [19]

Logic

[11] Patent Number: 5,653,022
[45] Date of Patent: Aug. 5, 1997

[54] METHOD FOR CUTTING TUBING

[75] Inventor: Jeff Logic, Racine, Wis.

[73] Assignee: Modine Manufacturing Company, Racine, Wis.

[21] Appl. No.: 433,696

[22] Filed: May 3, 1995

Related U.S. Application Data

[62] Division of Ser. No. 262,993, Jun. 20, 1994.

[51] Int. Cl.$^6$ ........................................... B26D 1/56
[52] U.S. Cl. .................. 29/890.053; 29/33 T; 29/33 D; 29/414; 225/100
[58] Field of Search ..................... 29/726, 33 T, 33 D, 29/890.053, 413, 414, 712, 720; 225/100

[56] References Cited

U.S. PATENT DOCUMENTS

| | | | |
|---|---|---|---|
| 2,024,485 | 12/1935 | Sussman | 29/33 D |
| 2,158,400 | 5/1939 | Chamberlin | 29/33 |
| 2,222,842 | 11/1940 | Humphrey | 164/12 |
| 2,621,106 | 12/1952 | Abbey | 29/33 T |
| 2,631,361 | 3/1953 | Wallace | 29/33 D |
| 2,782,743 | 2/1957 | Kennedy | 29/33 D |
| 3,730,411 | 5/1973 | Brockmuller | 225/100 |
| 4,577,789 | 3/1986 | Hoffmann et al. | 225/100 |
| 5,143,268 | 9/1992 | Stroup, Jr. | 225/2 |
| 5,201,117 | 4/1993 | Wright | 29/890.05 |
| 5,272,805 | 12/1993 | Akeel et al. | 29/712 |
| 5,472,126 | 12/1995 | Stroup, Sr. et al. | 29/890.053 |

FOREIGN PATENT DOCUMENTS

| | | | |
|---|---|---|---|
| 863931 | 1/1953 | Germany | 29/33 D |

*Primary Examiner*—Larry I. Schwartz
*Assistant Examiner*—Marc W. Butler
*Attorney, Agent, or Firm*—Wood, Phillips, VanSanten, Clark & Mortimer

[57] ABSTRACT

The slow production rates associated with cutting machines for cutting extruded metal tubing to length are avoided in an apparatus that continually cuts extruded metal tubing (46) and which include a reel (44) for providing a coil of (42) of metal tubing (46) to a cutting nip defined by rollers (66) carrying scoring knives (68). The tubing is continuously moved through the nip by a continuously operated set of feeding rolls (70) and then passed to a set of pull rolls (74) which are driven at a more rapid rate to place the tubing (46) in tension to cause it to be severed where scored. Also disclosed is a method of continuously cutting extruded metal tubing.

14 Claims, 3 Drawing Sheets

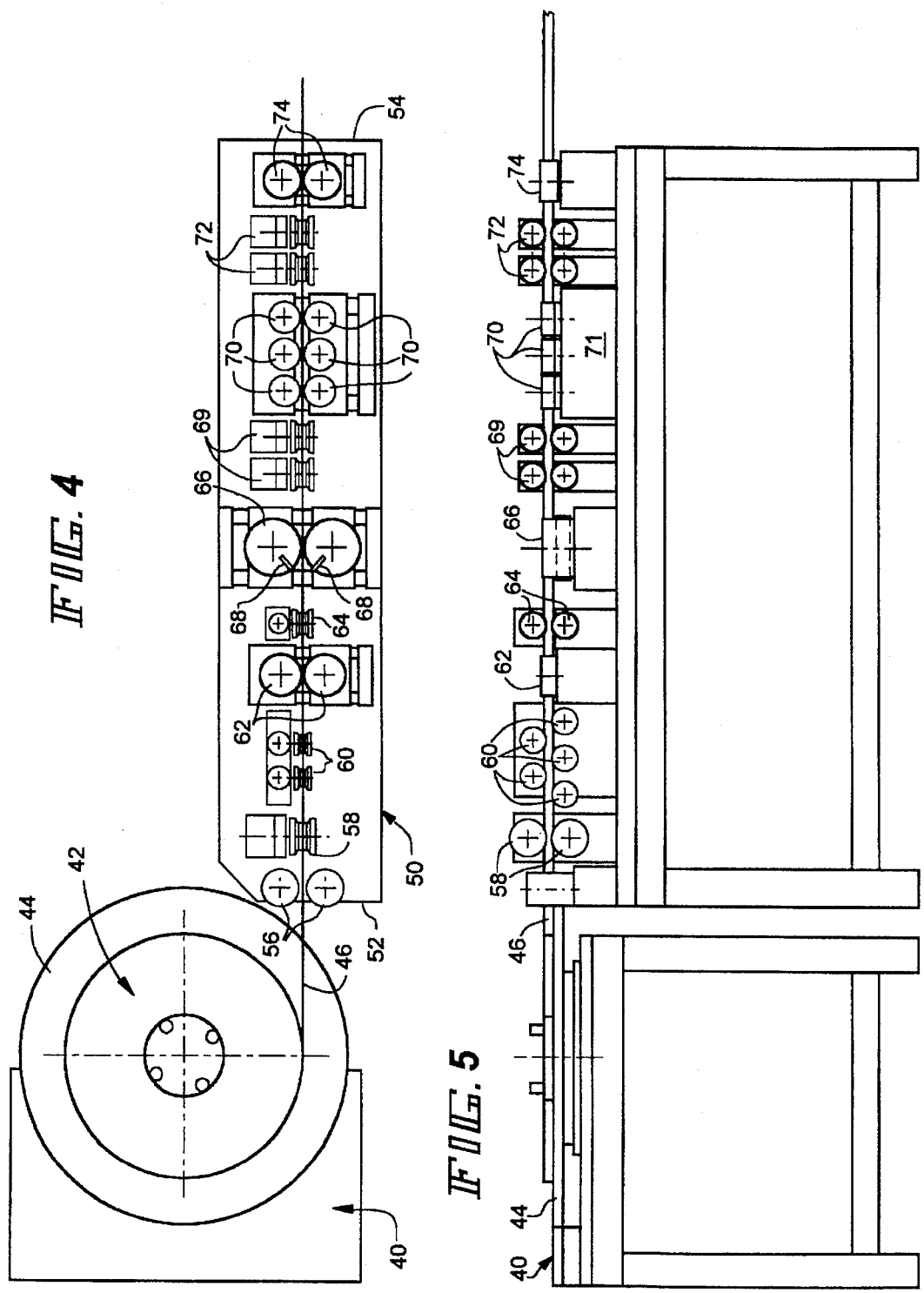

METHOD FOR CUTTING TUBING

This is a division of application Ser. No. 08/262,993, filed Jun. 20, 1994.

FIELD OF THE INVENTION

This invention relates to tube cutting apparatus and methods, and more particularly, to methods and apparatus for continuously cutting extruded metal tubing of flattened cross section having tube major and minor dimensions.

BACKGROUND OF THE INVENTION

Since the introduction of parallel flow heat exchangers in 1986, their popularity has soared. Parallel flow heat exchangers, particularly when utilized as condensers or evaporators and provided with multiple flow paths of relatively small hydraulic diameter (i.e., a hydraulic diameter up to about 0.070"), have excellent efficiency. They may be readily formed of aluminum components and thus are light of weight. As such, they are ideally suited for automotive applications and provide an energy savings therein because they contribute to a reduced vehicle weight.

When used in air conditioning or refrigeration applications, they are environmentally friendly in that the heat exchangers themselves have a relatively small internal volume, thereby reducing the refrigerant charge required and thus reducing the amount of refrigerant that could be discharged to the atmosphere in the event of a system leak.

Moreover, they are readily adaptable for use with a variety of differing refrigerants, including those that pose a considerably reduced danger to the ozone layer than, for example, CFC-12.

One typical parallel flow construction is disclosed in U.S. Pat. No. 4,998,580 to Guntly, et al. From a review of that patent, it can be readily appreciated that parallel flow heat exchangers are characterized by the use of a number of tubes of flattened cross section which extend in both geometric and hydraulic parallel between two opposed headers. In some cases, baffles may be located in one or both of the headers so as to provide a multiple pass configuration, but there remains a series individual tubes of flattened cross section that extend between the headers.

Initially, and as disclosed in the '580 patent, the flattened tubes were so-called "fabricated tubes" because they were made by introducing an undulating insert into a tube of flattened cross section and bonding the insert as by brazing to both interior sides of the flattened tube. However, as recognized by Guntly in the '580 patent, extruded tubes would work equally well.

As the popularity of the parallel flow heat exchangers increased, tube extrusion techniques also improved to provide extruded tubes for use in parallel flow heat exchangers with the thought of eliminating the expense of assembling the inserts to the interior of the tubes.

That in turn led to a need for a means for cutting the extruded tube to the relative short lengths needed in assembling a parallel flow heat exchanger.

Various techniques for severing such tubing have evolved.

In U.S. Pat. No. 5,133,492 issued Jul. 28, 1992, to Wohrstein, the flattened tube is scored on opposite sides along its tube major dimension. The scoring is such that the depth of cut is less than the wall thickness of the tube at that point.

Through the use of clamping devices applied to the tubes on opposite sides of the score, a parting force is exerted on the tube. It is also possible to wiggle a free end of the tube on one side of the scoring to cause the same to break as a result of fatigue.

One difficulty with this approach is that the breaks are not particularly clean along the entirety of the tube major dimension. And as such tubes conventionally have interior webbing defining as few as two, but more likely, eight or more, discreet, interior passages of relatively small hydraulic diameter, the lack of a clean break can result in braze metal plugging or partially occluding one or more of the channels thus, obstructing flow and reducing heat transfer efficiency.

A similar approach is disclosed in U.S. Pat. No. 5,249,345 issued Oct. 5, 1993 to Virsik, et al. Virsik, rather than merely scoring the tube, actually removes metal from the tube sidewalls in forming a kerf. Through the use of clamps which are moved longitudinally away from one another, tension is placed on the tube at the kerf cause the same to rupture. Tubing cut by the Virsik method is subject to the same potential plugging problems.

Moreover, both of these methods are relatively slow in that the tube is intermittently advanced and then halted while some operation is performed on it. Consequently, production of a given number of tube lengths is unduly time consuming and, thus, expensive.

The present invention is directed to overcoming one or more of the above problems.

SUMMARY OF THE INVENTION

It is the principal object of the invention to provide a new and improved method of cutting tubing of flattened cross section. It is also an object of the invention to provide a new and improved apparatus for cutting such tubing.

Even more specifically, it is an object of the invention to provide a method for cutting flattened tubing while the same is continuously being fed to maximize production and thus, provide economy in the tube cutting operation.

According to one facet of the invention, a method of cutting continuous extruded metal tube of flattened cross section having a minor dimension and a major dimension is provided and comprises the steps of:

(a) Continuously advancing an extruded metal tube into a cutting nip;

(b) Making aligned cuts completely or partly through opposed tube walls along the tube major dimension of the advancing tube at the cutting nip while leaving opposed tube walls along the tube minor dimension intact, and (c) Downstream of the cutting nip, advancing the tube at a rate in excess of the rate of advance of the tube provided by step (a).

As a consequence, the tube is placed in tension and separates at the scores created by the aligned cuts provided by step (b).

The process is completely continuous and does not require intermittent stopping or starting of the tube.

In one embodiment, step (a), the step of advancing, is performed by pulling the tube through the cutting nip.

In a highly preferred embodiment, step (a) is performed by engaging the tube with a first set of drive rollers having drive surfaces with a high co-efficient of friction and located downstream of the cutting nip. Step (c) is performed by engaging the tube with a second set of drive rollers located downstream from the first set.

In a preferred embodiment of the invention, step (b), the step of making aligned cuts, is performed by advancing the tube between a pair of synchronized rollers. Each of the rollers carries a knife blade having a cutting edge extending outwardly of the roller surface of distance sufficient to completely or partly penetrate the adjacent wall of the tube as it passes through the nip, but insufficient to cut halfway through the tube.

In a preferred embodiment, the synchronized rollers additionally generally inelastically compress the tube across its minor dimension to size the tube in its minor dimension.

According to another facet of the invention, a method is provided which includes the steps of (a) advancing oversized extruded aluminum tubing of flattened cross section having a major dimension and a minor dimension at a first continuous rate; (b) engaging the tubing along its major dimension with spaced rollers so as to generally inelastically compress the tube to size it to a desired minor dimension; (c) substantially simultaneously with step (b), engaging opposite sidewalls of the tube along its major dimension with aligned knives to sever the sidewalls of the tubes along its major dimension without completely severing the tube; (d) engaging the tube across its minor dimension with spaced rollers to generally inelastically compress the tube to size the tube major dimension; and (e) thereafter advancing the tube at a second rate greater than the first rate to fully sever the tube into dimensioned lengths.

Preferably, the second rate is at least about two or three times greater than the first rate.

A highly preferred embodiment of the method includes the steps of (a) providing a coil of continuous extruded metal tube of flattened cross section to have a tube minor dimension and a tube major dimension; (b) continuously feeding tube from the coil and straightening the tube; (c) initially sizing one of the tube major and minor dimensions; (d) initially sizing the other of the tube major and minor dimensions; (e) scoring completely through the tube wall along the tube major dimensions; (f) finally sizing the tube minor dimension; (g) finally sizing the tube major dimension; (h) continuously applying a first driving force to the tube; and (i) apply a second driving force to the tube greater than the first driving force to sever the tube where it has been scored.

In a highly preferred form of this embodiment of the invention, steps (e) and (f) are performed simultaneously by moving the tube through a cutting and sizing nip defined by a pair of adjacent rollers, each carrying a scoring blade.

The invention also contemplates apparatus for continuously cutting extruded metal tubing at a predetermined length. In one embodiment, the apparatus includes means for providing a supply of continuous metal tubing to be cut to length along with means defining a path of travel for the tubing from the providing means to a discharged point. The apparatus includes means defining a cutting nip on the path including scoring blades on opposite sides of the path mounted sufficiently close to the path to pierce and score the sidewall of the tube at the adjacent side of the path. The cutting nip defining means further includes a means for moving the blades at the same speed at which tubing is moving in the path and with the blades on opposite side of the path paired and in alignment with one another.

Means are located along the path for continuously feeding tube along the path at a first speed and means are provided along the path downstream of the feeding means for accelerating the tube from the first speed to place the same in tension to sever the tube.

In a preferred embodiment of the invention, the nip defining means comprises blade mounting means frictionally engagable with tubing in the path to be moved thereby so as to periodically bring the blades into engagement with the tubing as it moves in the path. Thus, the frictional engagement constitutes the moving means.

In a preferred embodiment of the invention, the feeding means is located downstream on the path of the nip defining means.

In one embodiment of the invention, the moving means comprises a servo motor, a servo system for controlling the servo motor, and an encoder for sensing tube velocity in the path and providing a signal representative thereof to the servo system.

In another embodiment of the invention, the moving means is connected to the feeding means to be driven thereby. A clutch is interposed between the moving means and the feeding means and an encoder is utilized for sensing tube velocity in the path and cyclically engaging the clutch to operate the moving means.

In a highly preferred form of this embodiment of the invention, the clutch is a one revolution clutch.

In an embodiment of the apparatus particularly suited for cutting flattened tubing having a tube major dimension and a tube minor dimension, the same includes a first set for sizing rollers along the path for engaging the tube along its minor dimension and deforming the tube to produce a desired tube major dimension. Also included is a second set of sizing rollers along the path for engaging the tubing along the tube major dimension and deforming a tube to produce a desired tube minor dimension.

In a highly preferred embodiment of the invention, there are two of the first sets and two of the second sets. A first of each set performs an initial sizing operation and the last of each set performs a final sizing.

In a highly preferred form of the invention, the last one of the set additionally constitutes the nip defining means.

A highly preferred form of apparatus made according to the invention includes a machine frame having an input end and a discharge end. Straightening rollers are disposed on the frame at the input end for receiving tubing from a coil or the like and straightening the same. Initial sizing rollers are disposed on the frame and comprise a first roller set for engaging the tubing to initially size the tube minor dimension and a second roller set at 90° to the first roller set for engaging tubing to initially size the tube major dimension. A pair of scoring and sizing rollers is located on the frame downstream of the first and second roller sets. The scoring and sizing rollers are closely spaced to finally size the tube minor dimension and carry scoring blades for scoring respective sides of the tubing. A third roller set is disposed on the frame downstream of the scoring and sizing rollers for engaging tubing and finally sizing the tube major dimension. Feed rolls are located on the frame downstream of the third roller set for continuously drawing tubing through the straightening rollers, the first, second and third roller sets and the scoring and sizing rollers. Guide rollers are located on the frame for receiving tubing from the feed rolls and pull rollers are located at the discharge end for receiving tubing from the guide rollers and placing a tension force thereon.

In a highly preferred embodiment, both the feed rollers and the pull rollers have high friction surfaces for engaging the tubing.

In an exemplary embodiment, the high friction surfaces are polyurethane.

Other objects and advantages will become apparent from the following specification taken in connection with the accompanying drawings.

DESCRIPTION OF THE DRAWINGS

FIG. 4 is a plan view of an apparatus made according to the invention and designed to practice the method of the invention;

FIG. 5 is a side elevation of the apparatus;

DESCRIPTION OF THE PREFERRED EMBODIMENTS

Figure 1:
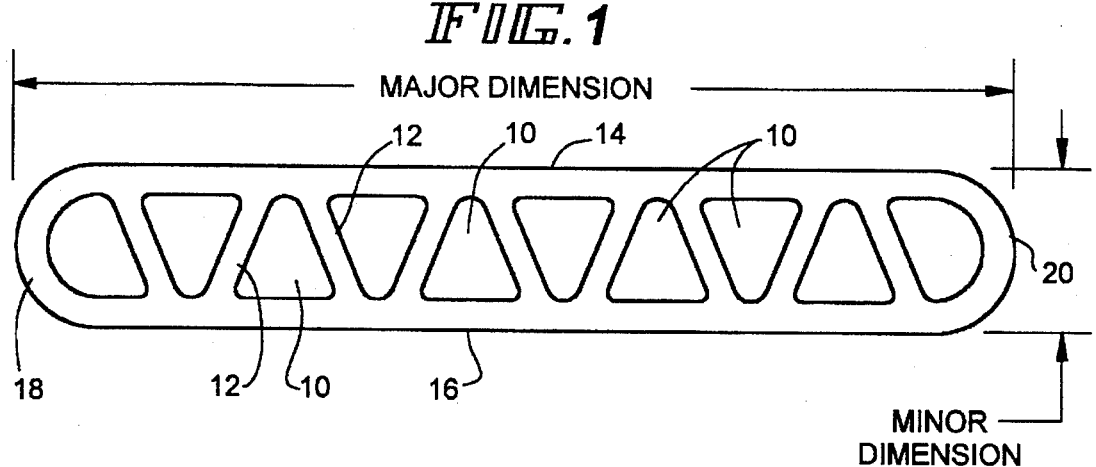
FIG. 1 is a sectional view of an aluminum, extruded tube of the type typically used in making parallel flow heat exchangers.

The cross section of tubing of the type intended to be the subject of the method and used on the apparatus of the invention is illustrated in FIG. 1. This tubing is typically extruded so as to have a plurality of triangular or rectangular channels 10 separated by webs 12 extending between side walls 14 and 16 which in turn are connected by end walls 18 and 20. In the usual case, the tube will be formed of aluminum by known extrusion techniques. Because dimensional control in extrusion is difficult to perform with any great degree of precision, the tubing will typically be formed somewhat oversize, that is, both its major dimension, that is its longest dimension, and its minor dimension, that is the dimension between the side walls 14 and 16, will be oversize, say 0.001" to 0.007" greater than the nominal size of the tubing.

Figure 2:
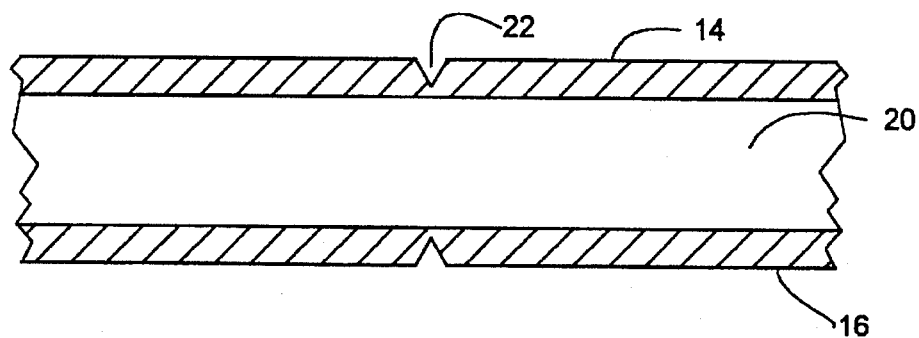
FIG. 2 illustrates how such tubing is scored or kerfed according to the prior art.

As seen in FIG. 2, according to prior art methods, the side walls 14 and 16 are scored or kerfed as at 22 and 24. It will be readily appreciated that the scores or kerfs 22, 24 are not of sufficient depth to completely penetrate the side walls 14, 16.

In contrast, according to the best mode of the present invention, aligned scores 26 and 28 are respectively located in the side walls 14 and 16 and are formed of sufficient depth so as to fully penetrate the respective walls to enter the hollow interior 30 of the tube while leaving the side walls 18, 20 intact. It has been determined that when the tube is subsequently placed in tension after the scores 26, 28 have been formed, extremely clean and rapidly formed breaks are obtained at that location such that there is no need to be concerned with occluding or plugging one or more of the interior passages 10. At the same time, it should be noted that the invention also contemplates the use of scores that do not fully penetrate the side walls 14, 16, such as the scores 22, 24.

Turning now to FIGS. 4 and 5, the apparatus and method of the invention will be described in greater detail. The apparatus includes a coil unwinding table, generally designated 40. A coil, generally designated 42, of the tubing may be disposed on a spindle 44 which is journalled to the table 40 in a known way. A strand 46 of the tubing coming off of the coil 44 may either be drawn off the reel 44 or, in some instances, the reel 44 may be powered if desired.

In any event, the apparatus includes a machine frame, generally designated 50. The frame 50 includes an input end 52 and a discharge end 54. At the input end is a first pair of rollers 56 which are journalled for rotation about a vertical axis and are disposed on opposite sides of the strand 46. The rollers 56 are simply guide rollers for the strand to guide the same as it fed along a path of movement on the machine frame 50.

The rollers 56 may have a purely cylindrical surfaces of substantially greater axial length in the tube major dimension.

The rollers 56 are followed by a pair of grooved rollers 58. The rollers 58 are mounted on the frame 50 for rotation about a horizontal axis. The rollers 58 are also guide rollers and they engage the tubing strand 46 on its minor dimension.

The guide rollers 58 are then followed by a series of rollers 60 which are rotatable about horizontal axes. The rollers 60 are also grooved. The grooves in the rolls 60 are sized to snugly accommodate the tube minor dimension and are located on staggered axes as best seen in FIG. 5. The rollers 60 thus act as straightening rollers to assure that the strand 46 is straight and has no residual curve as a result of being in the coil 42.

The rollers 60 are then followed by a pair of sizing rollers 62 which are rotatable about vertical axes. As noted previously, the tubing 46 will typically be oversized as it comes from the extruder and in order to assure that the oversized tubing is not such as to interfere with subsequent assembly of the tube into heat exchangers, the rollers 62 generally inelastically compress the tube across its minor dimension to perform an initial sizing operation on the tube to initially size the tube minor dimension. That is to say, the rolls 62 engage the tube on opposite sides on its major dimension to act across the minor dimension. The rollers 62 typically have a purely cylindrical shape.

A second initial sizing operation follows that performed by the rolls 62. A pair of rolls 64 rotatable about horizontal axes also generally inelastically compress the tube strand 46 by acting across its major dimension, that is, by engaging it on opposite sides at its minor dimension. The rollers 64 are typically grooved and when the tube strand 46 exits the rollers 64, both its major dimension and its minor dimension will be very nearly that which is desired.

In one embodiment of the invention, the rollers 64 are followed by a pair of scoring and sizing rollers 66. The rollers 66 are rotatable about vertical axes and carry scoring blades 68 on their cylindrical peripheries. The rollers 66 are typically interconnected by a timing gear or the like so that they rotate in opposite directions at the same angular velocity and in synchronism. The rollers 66 with the blades 68 define a cutting nip into which the tube strand 46 is introduced as it emerges from the sizing rollers 64.

In the usual case, the rollers 66 will carry but a single one of the blades 68 each. The blades 68 are moved in unison so as to be in alignment and simultaneously create the scores 26, 28 on opposite side walls 14, 16 (FIG. 3) as the tube strand 46 advances.

The blades 68 are ground of conventional blade stock. They may be ground on one or both sides to an edge having an included angle in the range of about 18° to 32°. When ground on both sides, they are typically, but not necessarily, ground symmetrically.

To assure that the proper length of the tubing is obtained between cuts, the rollers 66 are chosen to have a cylindrical periphery of a length that is equal to the desired tube length. Thus, in this embodiment of the invention, if a different tube length is selected, it is necessary to switch to a different set of differently sized ones of the rolls 66.

The rolls 66 in this embodiment of the invention are not driven except by frictional contact with the strand 46. In many cases, it is believed that nothing need be done to the surface of the rollers 66 to cause the same to frictionally engage and couple to the tube strand 46 as it moves through its path on the machine frame 50. However, if slippage is encountered, it may be avoided by providing a knurl on the cylindrical surface of one or both of the rollers 66.

The rollers 66 are also disposed in sufficient proximity to perform a final sizing operation on the tube strand acting across the tube minor dimension. That is to say, they substantially (though obviously not completely) inelastically deform the tube as it passes through the cutting nip defined by the rolls 66 to the final desired minor dimension.

As the scored tube strand 46 emerges from the rolls 66, it is directed to rolls 69 which are final sizing rolls for finally sizing the tube major dimension. Again, grooved rollers rotatable about horizontal axes acting against tube minor dimensions ends 18, 20 (FIG. 1) are employed.

Figure 3:
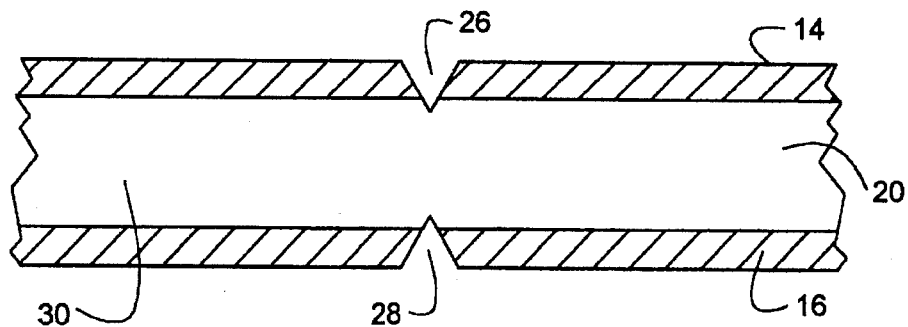
FIG. 3 illustrates how such tubing is scored according to a preferred embodiment of the present invention.

The tube strand 46 is then passed between three pairs of drive rollers 70. The rollers 70 are driven about vertical axes by a motor 71 or the like so that their peripheral angular velocity is equal to the desired velocity of the strand 46 through the apparatus. It is highly preferred that the rollers 70 have a high friction surface (that is, a high coefficient of friction) to tightly grip the tube strand 46, both to assure that the latter is cleanly pulled from the reel 44 through the various stations mentioned previously as well as to assure that the same may be placed under a good deal of tension sufficient to sever the tube at the scores 26, 28 (FIG. 3). One material that may be used to provide a high friction surface is a polyurethane covering on the rollers 70.

To positively assure maximum friction, the rollers 70 engage the tube along its major dimension to maximize the contact area therewith.

After the tube emerges from the drive rolls 70, the same is passed through guide rolls 72 that are rotatable about horizontal axis and then directed to a pair of pull rollers 74 located at the discharge end 54 of the frame. The pull rollers 74 are rotatable about vertical axes and, like the feed rollers 70, engage the side walls 14, 16 of the tube with a great deal of friction to firmly frictionally grip the same. In addition, the pull rollers 74 are driven by a motor 76 at a speed to have an angular velocity that is greater than the angular velocity of the feed rollers 70, preferably by a factor of two or three times or more. As a consequence of this, the pull rollers 74 tend to accelerate the tube strand 46 out of the apparatus, placing the same in tension. Because of the good frictional contact between the pull rollers 74 and the tube 46, coupled with the fact that the ends of the severed lengths of tube are very cleanly severed as a result of the depths of the scores 26, 28 (FIG. 3) there is very little possibility that one or more of the passages 10 (FIG. 1) will be plugged during the subsequent brazing process. It is to be observed that the most downstream roll of the feed rollers 70 must be spaced from the pull rollers 74 by a distance greater than the intended tube length and less than twice the intended tube length to obtain the desired severing. Because in the usual case the spacing will be such that the break occurs shortly after the scored part of the tube exits the feed rollers 70, the guide rollers 72 are provided to assure the free end of the tube is guided to the pull rollers 74.

It is to be specifically noted that the feed rollers 70 and/or pull rollers 74 could be replaced with other elements performing like functions if desired. For example, opposed crawler tractor type track belts sandwiching and gripping the tube 46 could be used in either or both locations.

As another alternative, the pull rollers 74 could be replaced with rollers that do not normally contact the tube 46, but which come together and grip the tube 46 upon receipt of an appropriate command. Similarly axially movable clamp pads that grip the tube 46 but which move at a high velocity could be used.

Figure 6:
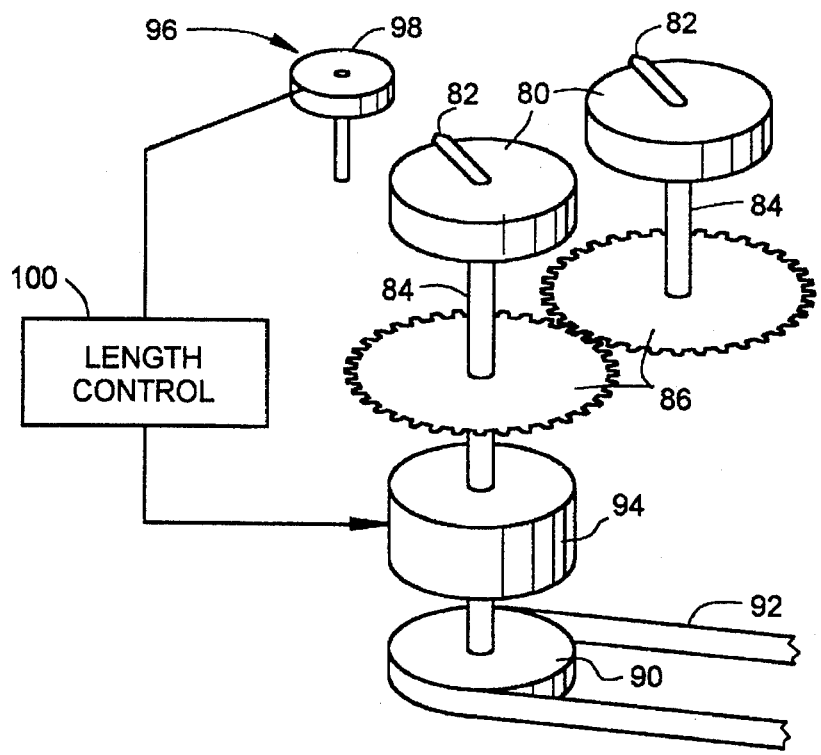
FIG. 6 is a fragmentary, perspective view of a modified embodiment of the apparatus.

The form of apparatus shown in FIGS. 4 and 5 is highly preferred because it is relatively simple. However, because the diameter of the scoring and sizing rolls 66 is necessarily dependent upon the intended length of tube, where especially long tube lengths are to be formed, other embodiments of the invention may be used. In such other embodiments, the rollers 66, or like rollers, but without the blades 68, may be retained to perform a final sizing operation. An additional scoring station is added to the apparatus at or upstream of the rolls 66 and may include a pair of rolls 80 (FIG. 6) whose sole function is to carry scoring knives 82. The rolls 80 are rotatable about vertical axis on shafts 84 and meshed timing gears 86 assure that the same rotate in synchronism so that the knives 82 align.

The arrangement is such that the rolls 80 define a nip that is larger than the tube minor dimension so that, in normal operation, the tube strand 46 may pass freely between the rolls 80. However, the scoring edges of the knives 82 are sufficiently close to one another to produce the desired scoring of the tube.

One of the shafts 84 includes a sheave 90 which in turn may be coupled by a timing belt 92 to the motor 71 that drives the feed rollers 70. The arrangement is such that when the rolls 80 are driven, the knives 82 will be moving at the same speed as the tube strand 46 is moving through the machine 50.

A conventional one revolution clutch 94 is interposed between the sheave 90 and the timing gears 86. As is well known, a one revolution clutch receives a mechanical or an electrical signal to engage and once it receives such a signal, it engages and drives its output shaft through but a single revolution.

The system also includes a conventional encoder, generally designated 96, having a wheel-like input 98 that may engage the strand 46 as it moves through the machine. The encoder 96 will provide signals in the form of a train of pulse indicative of the length of the strand 46 which has passed through the apparatus since the prior cut. These signals are provided to a length control circuit 100 which is operative to engage the one revolution clutch 94 at appropriate intervals to bring the knives 82 into contact with the tube strand 46 to form the scores 26, 28 (FIG. 3). For example, the encoder 96 may have an output of one thousand pulses for every revolution of the input 98 which is indicative of the travel of the tube strand 46 through the machine. These pulses may be accumulated in a conventional counter until a number of pulses indicative of the desired length has been accumulated. At such a time, the length control circuit 100 issues a signal to engage the one revolution clutch 94 and reset the counter and the process begins anew.

Figure 7:
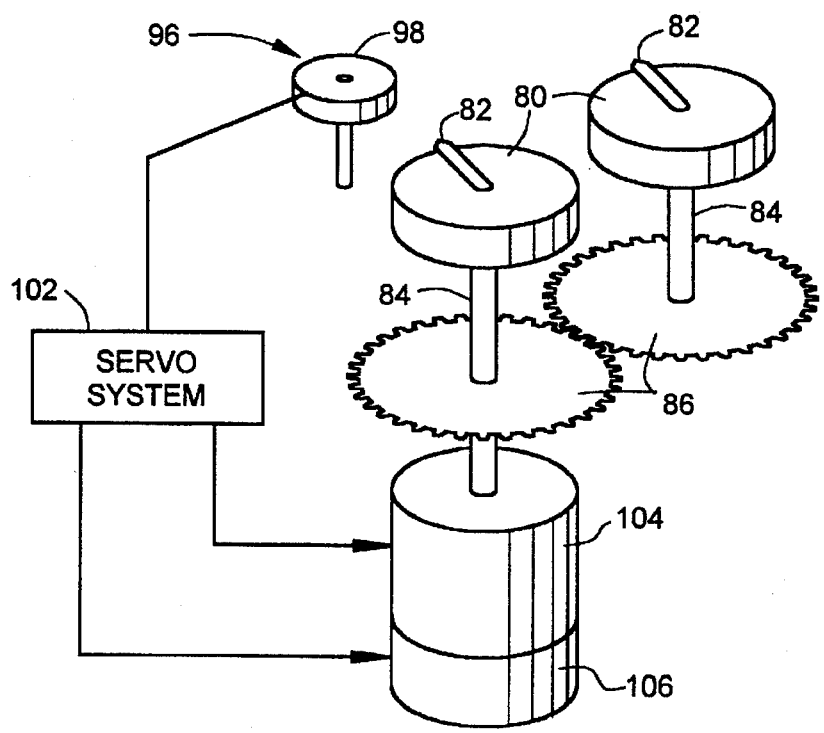
FIG. 7 is a view similar to FIG. 6, but of still another modified embodiment.

As an alternative, the encoder 96 may be used to provide both length and velocity information to a conventional servo system 102 (FIG. 7). In this embodiment, one of the shafts 84 is driven by a servo motor 104 which has a velocity feedback sensor 106 coupled thereto. Information is fed to the servo system 102 from the encoder 96 as before which, at appropriate intervals, directs the servo motor 104 to begin to rotate to drive the knives 82. The servo system 102 also tells the servo motor 104 the rate at which it is to operate and the actual rate of operation is fed back to the system 102 by the feed back 106 so that any corrections necessary can be made in a conventional fashion.

Where tubes having varying major dimension are to be processed on the apparatus, the axes of the lower ones of the rollers 58, 60, 64, 68 and 72 are preferably fixed while the axes of the upper ones of such rollers are vertically adjustable. This allows for rapid set up for a different size tube without having to adjust the coil unwinding table 40.

It should also be noted that while the best mode of the invention contemplates performing the sizing, scoring, feeding and pulling operations in the sequence just described, the order may be changed if desired. For example, the feeding rolls could precede rather than follow scoring and sizing rolls.

From the foregoing, it will be appreciated that the method and apparatus of the present invention provide substantial economic and production benefits over the prior art. By continuously operating the feed motor 71, a truly continuous severing process is achieved providing considerable economy to the operator. Furthermore, failures that may be associated with intermittent operations such as those employed in prior art devices are eliminated entirely through the continuous operation of the present invention.

In addition, by severing entirely through the tube walls of the tube being cut, extremely clean ends of the length of tubing can be achieved when otherwise process according to the method of the invention as by an apparatus made according to the invention. This same factor facilitates continuous operation because it reduces the pulling force that must be exerted on the scored tube by the pull rolls 74 to sever the tube.

Finally, while the invention has been described in connection with extruded tube, the same may also be used with efficiency in the severing of so-called fabricated tube as well.

I claim:

1. A method of cutting continuous metal tube of flattened cross section having a major dimension and a minor dimension defining tube walls and comprising the steps of:
   (a) continuously advancing a metal tube along a path of tube travel into a cutting nip;
   (b) at the cutting nip, making aligned cuts completely or partly through opposed tube walls along the tube major dimension of the advancing tube while leaving opposed tube walls along the tube minor dimension intact by moving opposed cutting blades along the path of tube travel simultaneously with the tube; and
   (c) downstream of the cutting nip, advancing the tube at a rate in excess of the rate of advancement of the tube provided by step (a).

2. The method of claim 1 wherein step (a) is performed by pulling the tube through the cutting nip.

3. The method of claim 1 wherein step (a) is performed by engaging the tube with a first set of drive rollers having drive surfaces with a high coefficient of friction and located downstream of said nip, and step (c) is performed by engaging the tube with a second set of drive rollers located downstream of said first set.

4. The method of claim 1 wherein step (b) is performed by advancing the tube between a pair of synchronized rollers, each of the rollers carrying a knife blade having a cutting edge extending outwardly of the roller surface a distance sufficient to completely or partly penetrate the adjacent wall of the tube as it passes through said nip, but insufficient to cut halfway through the tube.

5. The method of claim 4 wherein said synchronized rollers additionally substantially generally inelastically compress said tube across its minor dimension to size said tube in its minor dimension.

6. A method of dimensioning tubing for use in the fabrication of heat exchangers comprising the steps of:
   (a) advancing oversize extruded aluminum tubing of flattened cross section having a major dimension defining opposite side walls and a minor dimension along a path of tube travel at a first continuous rate;
   (b) engaging the tubing along its major dimension with spaced rollers so as to generally inelastically compress the tube to size it to a desired minor dimension;
   (c) substantially simultaneously with step (b), engaging opposite side walls of the tube, along its major dimension with aligned, movable knives moving along said path of tube travel at said first continuous rate to completely or partly sever the side walls of the tube along its major dimension without completely severing the tube;
   (d) engaging the tube across its major dimension with opposed, spaced rollers to compress the tube to size the tube major dimension; and
   (e) thereafter advancing the tube at a second rate greater than said first rate to fully sever the tube into dimensioned lengths.

7. The method of claim 6 wherein said second rate is at least about two or three times greater than said first rate.

8. The method of claim 6 wherein step (a) is performed by engaging the tube with feeding means after step (d) is performed.

9. The method of claim 6 wherein step (d) is performed after the performance of steps (b) and (c).

10. A method of cutting continuous extruded metal tube having a wall into lengths comprising the steps of:
    (a) providing a coil of continuous extruded metal tube of flattened cross section and having a tube minor dimension and a tube major dimension;
    (b) continuously feeding tube from the coil along a path and straightening the tube;
    (c) initially sizing one of the tube major and minor dimensions;
    (d) initially sizing the other of the tube major and minor dimensions;
    (e) scoring completely or partly through the tube wall of the tube along the tube major dimension by engaging the tube with a knife that moves simultaneously with the tube as the tube is moving in said path;
    (f) finally sizing the tube minor dimension;
    (g) finally sizing the tube major dimension;
    (h) continuously applying a first driving force to the tube; and
    (i) applying a second driving force to the tube and greater than the first driving force to sever the tube where it has been scored.

11. The method of claim 10 wherein steps (e) and (f) are performed simultaneously by moving the tube through a scoring and sizing nip defined by a pair of adjacent rollers, each carrying a scoring blade.

12. The method of claim 10 wherein said knife moves intermittently.

13. The method of claim 10 wherein said knife moves continuously.

14. A method of cutting continuous tube having spaced tube wall portions comprising the steps of:
    (a) continuously advancing a metal tube along a path of tube travel into a cutting nip;
    (b) at the cutting nip, moving aligned opposed cutting knives along said path simultaneously with and in the same direction as said tube and in engagement with said tube to make aligned cuts completely or partially through part, but not all, of the opposed tube wall portions while leaving a remainder of the opposed tube wall portions intact; and
    (c) downstream of the cutting nip, advancing the tube at a rate in excess of the rate of advancement of the tube provided by step (a).

* * * * *